(12) United States Patent
Rowe et al.

(10) Patent No.: US 8,473,707 B2
(45) Date of Patent: Jun. 25, 2013

(54) METHOD FOR ACHIEVING SEQUENTIAL I/O PERFORMANCE FROM A RANDOM WORKLOAD

(75) Inventors: Alan Rowe, San Jose, CA (US); Chandrika Srinivasan, Sunnyvale, CA (US); Sameer Narkhede, Sunnyvale, CA (US); Wing Yee Au, Saratoga, CA (US); Ismail Dalgic, Sunnyvale, CA (US)

(73) Assignee: Open Invention Network, LLC, Durham, NC (US)

( * ) Notice: Subject to any disclaimer, the term of this patent is extended or adjusted under 35 U.S.C. 154(b) by 1432 days.

(21) Appl. No.: 12/057,120

(22) Filed: Mar. 27, 2008

(65) Prior Publication Data

US 2009/0249022 A1    Oct. 1, 2009

(51) Int. Cl.
*G06F 12/00* (2006.01)
(52) U.S. Cl.
USPC ..... 711/170; 711/167; 711/169; 711/E12.001

(58) Field of Classification Search
USPC .......... 711/112, 170, 169, 202, 203, E12.002, 711/167, 206, 12.001
See application file for complete search history.

(56) References Cited

U.S. PATENT DOCUMENTS

| 5,551,003 | A  | * | 8/1996  | Mattson et al. ............... 711/136 |
|-----------|----|---|---------|---------------------------------------|
| 5,596,736 | A  | * | 1/1997  | Kerns ............................. 711/170 |
| 7,409,522 | B1 | * | 8/2008  | Fair et al. ...................... 711/170 |
| 7,549,014 | B1 | * | 6/2009  | Fair ............................... 711/112 |
| 7,664,912 | B2 | * | 2/2010  | Ito et al. ......................... 711/112 |
| 2006/0069845 | A1 | * | 3/2006 | Ishida et al. ..................... 711/4 |
| 2008/0077762 | A1 | * | 3/2008 | Scott et al. .................... 711/170 |
| 2009/0067241 | A1 | * | 3/2009 | Gorobets et al. ......... 365/185.04 |

* cited by examiner

*Primary Examiner* — Pierre-Michel Bataille
(74) *Attorney, Agent, or Firm* — Haynes and Boone, LLP

(57) ABSTRACT

Some embodiments of the present invention provide methods, computer media encoding instructions, and systems for receiving write requests directed to non-sequential logical block addresses and writing the write requests to sequential disk block addresses in a storage system. Some embodiments further include overprovisioning a storage system to include an increment of additional storage space such that it is more likely a large enough sequential block of storage will be available to accommodate incoming write requests.

2 Claims, 6 Drawing Sheets

METHOD FOR ACHIEVING SEQUENTIAL I/O PERFORMANCE FROM A RANDOM WORKLOAD

TECHNICAL FIELD

This invention relates to data storage and more particularly to the I/O workload generated by applications such as video surveillance.

BACKGROUND OF THE INVENTION

Many currently-provided data storage systems receive write requests directed to random or disparate disk locations. One reason may be because write requests are received by a storage system controller from multiple sources. Furthermore, file systems, such as Microsoft NTFS, themselves may route incoming write requests to random disk addresses of a storage system, typically sending incoming write requests to whichever free area of the storage system it chooses. The performance of a storage system would likely improve if data were written to it in a more orderly manner.

SUMMARY OF THE INVENTION

Aspects of the present invention provide methods, computer media encoding instructions, and systems for receiving write requests directed to logical block addresses and writing the write requests to sequential disk block addresses in a storage system. Aspects of the present invention include over-provisioning a storage system to include an increment of additional storage space such that it is more likely a large enough sequential block of storage will be available to accommodate incoming write requests

DETAILED DESCRIPTION

Some embodiments of the present invention provide methods, computer media encoding instructions, and systems for receiving write requests directed to logical block addresses and writing the write requests to sequential disk block addresses in a storage system. Some embodiments further include overprovisioning a storage system to include an increment of additional storage space such that it is more likely a large enough sequential block of storage will be available to accommodate incoming write requests. Certain details are set forth below to provide a sufficient understanding of embodiments of the invention. However, it will be clear to one skilled in the art that embodiments of the invention may be practiced without various of these particular details. In some instances, well-known circuits, control signals, timing protocols, storage devices, and software operations have not been shown in detail in order to avoid unnecessarily obscuring the described embodiments of the invention.

Figure 1:
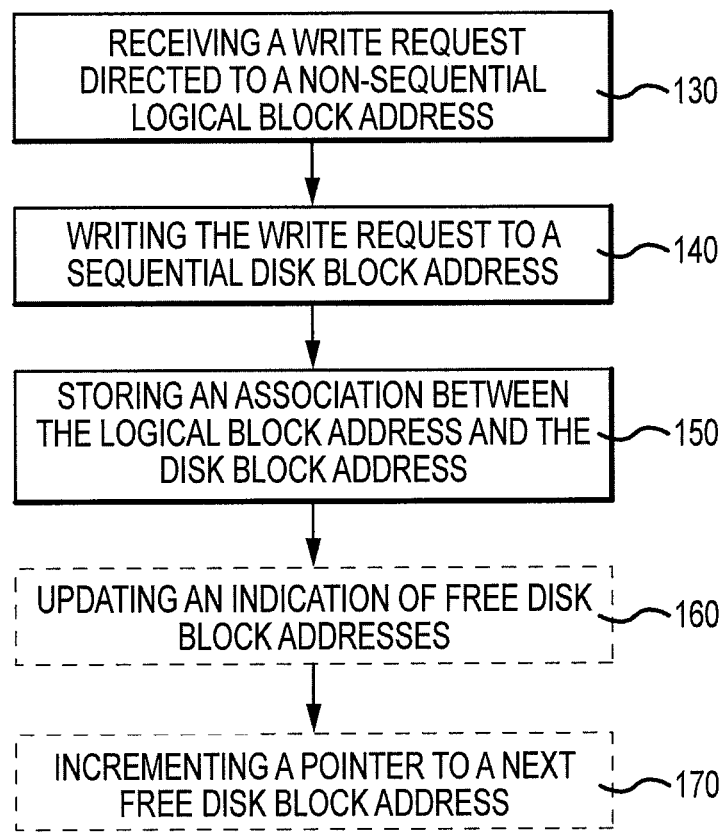
FIG. 1 is a schematic flowchart of a method according to an embodiment of the present invention.

A schematic diagram describing a method according to an embodiment of the present invention is shown in FIG. 1. A write request is received 130 directed to a non-sequential logical block address. Generally, the write request includes write data and the specified logical block address. The logical block address is an address received from a user, other process, or file system passing the write request to a storage system or storage system controller. The logical block address received 130 is non-sequential with respect to a previously received logical block address. The write request is actually written 140 to a sequential disk block address, different from the received logical block address requested in the write request and sequential to a previously-written disk block address. A disk block address is an address assigned for the write data on a disk, relative to the disk's volume. An association between the received logical block address, where a user or process requested the data be written, and the disk block address, where the data was written, is then stored 150. The process may continue by repeating 130-150 with further received write requests directed to non-sequential logical block addresses. In embodiments of the present invention, the write requests described in FIG. 1 may arrive one after the other, however in some embodiments the write requests are received simultaneously.

When a read request is received, the read request specifies a logical block address. Since the data was not stored at the logical block address, but instead at a disk block address determined as described above, reference is made to the logical block address associations to determine which disk block address is associated with the logical block address. The read data is then retrieved from the associated disk block address.

A free disk block indicator may be stored and updated 160 as data is written to disk blocks. For example, the indicator may be a map of disk block addresses associating a particular value with the addresses that are free. By referencing this indication, a free disk block can be identified and selected. In some embodiments, a pointer is set at the first identified free disk block address. A second free disk block address for a subsequent write can be identified by incrementing 170 the pointer to the next available free disk block address. The next available disk block address may be a sequential disk block address. However, if the sequential disk block address is unavailable, the pointer is set to the next available free disk block address in some embodiments.

Each incoming write request in may be directed to a disk block address determined by identifying a next free disk block address and directing a write request to the next available free disk block address. If the next sequential disk block address is not free, embodiments of the present invention direct the incoming write request to the next available disk block address, and sequential operation is continued for subsequent received write requests when possible.

Generally, write requests received will be of a fixed size corresponding to a size of the disk blocks in a storage volume. Any fixed size may generally be used, such as 64 kilobytes, 32 kilobytes, or any other size. However, some write requests may be received which are longer or shorter than the fixed size. Larger write requests may be reformatted as a sequence of requests having the fixed size with header and/or trailer information added as needed. Write requests smaller than the fixed size can be dealt with in several ways. In one embodiment, a write request smaller than the fixed size is received (for example, a request to write to 40 k of the 64 k disk block). The write request references a logical block address. The lba_map, or other indicator, may be consulted to determine where the data corresponding to the received logical block address is stored, and the write request written to that disk block address, instead of the next free disk block address. While this disrupts sequential writes, it preserves the remaining data in the disk block beyond the portion written. In another embodiment, the write request shorter than the block size is written to the next free disk block address, however the remaining data needed to fill the block is read from the block address where it was previously stored, as determined by the lba_map or other indicator. This introduces a non-sequential read, but also preserves the data. Further, by writing to the next free disk block address, sequential operations can resume once the data in that block is written out or no longer needed.

Figure 2:
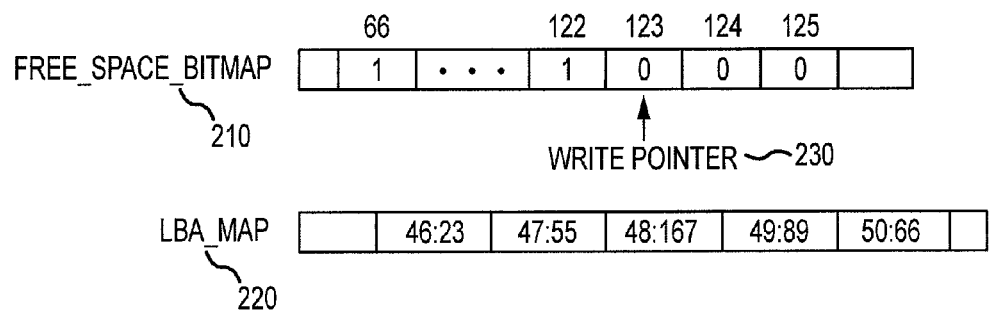
FIG. 2 is an illustration of a free space indicator and logical block address associations according to an embodiment of the present invention.
Figure 3:
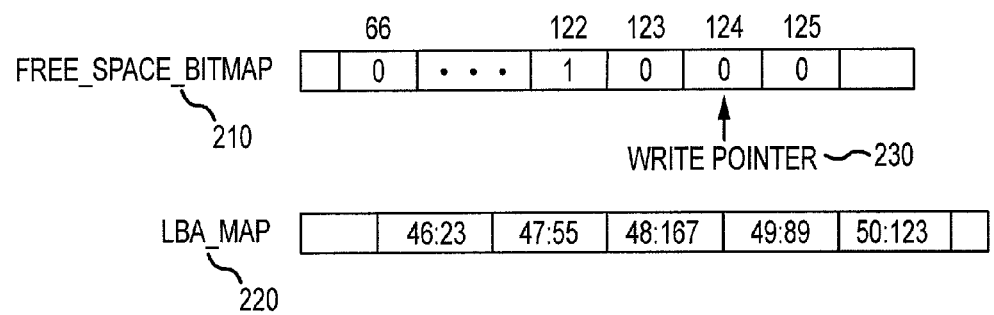
FIG. 3 is an illustration of a free space indicator and logical block address associations according to an embodiment of the present invention.

An example of an embodiment of the present invention is now described with reference to FIGS. 2 and 3. In this embodiment, the free disk block indicator includes a free space bitmap 210 that indicates of which of the disk block addresses are free. As shown in FIG. 2, the free space bitmap 210 stores a '0' for disk block addresses (such as 123, 124, 125 in FIG. 2) that are free, and a '1' for disk block addresses (such as 122) that are not free. Free space bitmap 210 represents a linear array, indexed by disk block address. A logical block address map 220 (lba_map) stores associations between received logical block addresses and corresponding disk block addresses. Those associations are shown in lba_map as "logical block address:disk block address". lba_map 220 shown in FIG. 2 is accordingly a linear array, indexed by logical block address. For clarity, only portions of lba_map and free_space bitmap are shown in FIG. 2. In one embodiment, one association table (such as lba_map) is provided for each volume in a storage system. A write pointer 230 may be set to indicate a next available free disk block address.

So, for example, if a write request arrives directed to logical block address 50 and the free_space_bitmap and lba_map contain the values shown in FIG. 2, the write data will be directed to a disk block address indicated by the write pointer (disk block address 123). An association between the logical block address received (logical block address 50) and the disk block address written to (disk block address 123) is now stored in lba_map 220. The previous association for logical block address 50 is shown in FIG. 2 in lba_map as 50:66. The new association, 50:123 is now stored. The previous associated disk block address, disk block address 66 in FIG. 2, can now be indicated as free. The write pointer 230 is also incremented to the next available free disk block address (disk block address 124 in FIG. 2). The next available free disk block address may be the next sequential address but that may not always be the case in some embodiments. However, some embodiments of the present invention structure the storage system such that the next free disk block address is frequently a sequential address.

When the write pointer reaches an end of a list of disk block addresses, it is incremented again to the start of the list, in some embodiments. Accordingly, after writing a write request directed to logical block address 50 to disk block address 123, the tables are updated as shown in FIG. 3, where write pointer 230 is incremented to disk block address 124 and an association between logical block address 50 and disk block address 123 is stored in lba_map 220. Further, free_space_bitmap 210 is updated to reflect disk block address 123 is no longer available, and disk block address 66 has become available. In embodiments of the present invention, disk block addresses are changed from unavailable (indicated by a '1' in FIGS. 2 and 3) to free (indicated by a '0' in FIGS. 2 and 3) when their corresponding logical block address is written to again.

In some embodiments, data stored in the disk block address is no longer needed when it is deleted by a user or another process. Additionally or instead, in some embodiments, data stored in the disk block address is no longer needed when it has been stored for a predetermined time, such as a retention time, determined by the storage system or an end user or process (for example, storing video data for one month).

Figure 3A:
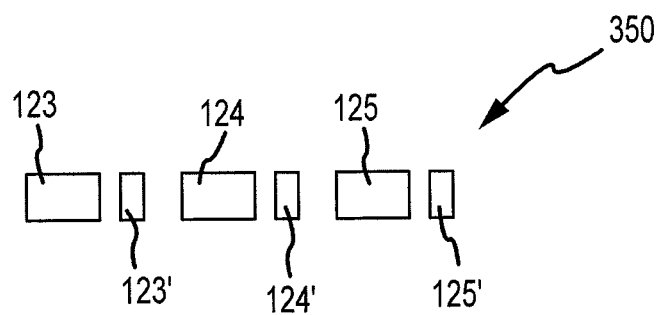
FIG. 3A is an illustration of a disk layout according to an embodiment of the present invention.
Figure 4:
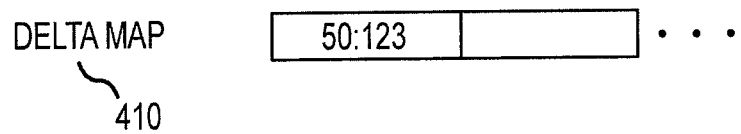
FIG. 4 is an illustration of a delta map according to an embodiment of the present invention.

To ensure data consistency after a system crash or other interruption, in some embodiments, the free space indicator and associations between logical disk block addresses and disk block addresses (free_space_bitmap and lba_map in FIGS. 2 and 3) are periodically written to non-volatile storage. While this may be done each time the indicators change, such as after every write, in some embodiments this undesirably slows the system down. Changes to the free space indicator and logical block address associations are stored as metadata along with the write request data in some embodiments. An embodiment of a disk layout 350 is shown in FIG. 3A. User data blocks, such as blocks 123, 124 and 125 are followed by metadata, shown as 123', 124' and 125'. By storing these changes along with the write request data, the sequential nature of the write operations may be maintained. Writing the changes to a separate location on disk could disrupt the sequential write operations. Accordingly, the changes may be written as metadata and stored in the same disk block address range as the write data itself. The metadata will have the same logical block address and disk block address association. To reconstruct the free space indicators and logical block address associations, the user data is scanned and relevant metadata extracted, in some embodiments. However, this reconstruction can be time consuming if the data is scattered across the disk. Accordingly, in some embodiments, another association, a delta map, is stored representing recent changes to the logical block address map. The delta map contains associations between logical and disk block addresses made since the last time the logical block address associations were written to non-volatile storage. An embodiment of a delta map 410 is shown in FIG. 4. Referring to the example described relative to FIGS. 2 and 3, assuming the lba_map and free_space_bitmap were written to non-volatile storage just prior to receiving the write request for logical block address 50, the 50:123 association is stored in the delta map 410. Metadata associated with the disk block address 123 will also have this same mapping. Once a predetermined number of write requests, or changes to the logical block associations have occurred, the delta map 410 is written to non-volatile storage in some embodiments.

So, for example, after 1000 write requests are received, the delta map 410 may be written to non-volatile storage. Then, after another predetermined number of write requests, the entire free space indicator and logical block associations, such as free_space_bitmap 210 and lba_map 220 in one embodiment, can be written to non-volatile storage. In one embodiment, free_space_bitmap and lba_map are written to non-volatile storage after 1000 writes of the delta map 410, or 1000*1000=1,000,000 write requests. Following a system crash or interruption requiring reconstruction of the free space indicator and logical block association indicator, a stored version of the indicators are retrieved. Using the exemplary numbers provided above, in one embodiment, these stored indicators are accurate to the last 1 million writes. The stored indicators are updated with the stored delta maps. In the embodiment described above, these delta maps provide data for the most recent n*1000 user writes. In some embodiments only the most recent writes (the most recent 1000 in the example described) are reconstructed by scanning metadata on the disk.

A disk block address may be reused once it is indicated as free, in some embodiments. As described above, a disk block address may be indicated as free when its corresponding logical block address is written to again, such as disk block address 66 in FIG. 3. If small regions of free disk block addresses are available at disparate locations, however, disk fragmentation may occur. In some embodiments, storage systems are provided for specific applications that have specific data retention requirements. These requirements can be leveraged in some embodiments to ensure disk block addresses are freed in a manner that allows sequential writes to continue. For example, in a video surveillance application, it may be desired to store a predetermined amount of received data for a predetermined retention time. In one example, a video camera may generate a one Gigabyte file during a certain recording time, one hour in one example, and the storage system may be required to keep the file for a predetermined retention time, such as 30 days. After the retention time, the space can be deallocated for use by another file. Accordingly, all or substantially all disk block addresses associated with the file may become deallocated after the file was written, one hour in this example. Similarly, disk block addresses associated with other sources of received data (such as other video cameras) being recorded at the same time will become deallocated at about the same time. If these files were written to sequential block addresses according to the methods described above, the deallocation of this space will create sequential free disk block addresses.

Recall that, as described above, newly freed disk block addresses are noted in the free_space_bitmap once their corresponding logical block addresses are again written to. This occurs following an adjustment time after the data in the disk block address is actually no longer needed, and may be deallocated by a file system. Accordingly, data in a disk block address may be no longer needed, and may be deallocated, after a predetermined retention time t in one embodiment. However, the status may not be updated in a free space indicator until an adjustment time, x, has elapsed in one embodiment. Accordingly, some embodiments of the present invention provide an overprovisioned amount of storage to take this adjustment time into account and increase the time when sequential disk block addresses are available. By providing an additional amount of disk block addresses beyond what is dictated by the system requirements of storing a predetermined amount of data for a predetermined time, the likelihood of having sequential disk block addresses to write to is increased. In the example described above, if there is sufficient overprovisioned area to continue storing received data for a time t+x, at that time sequential disk block addresses will become available through the recognition of deallocated space. Accordingly, in some embodiments, an overprovisioned amount of storage is provided. The amount of overprovisioning will be determined according to the amount of data expected in the time t+x, in some embodiments. The amount of overprovisioning may also be determined by considering disk block addresses used to store persistent data, such as file metadata, for example, which may not be deleted, and other space taken to store files that will not become available after a retention time, such as administrative or other non-deleted files.

Figure 5:
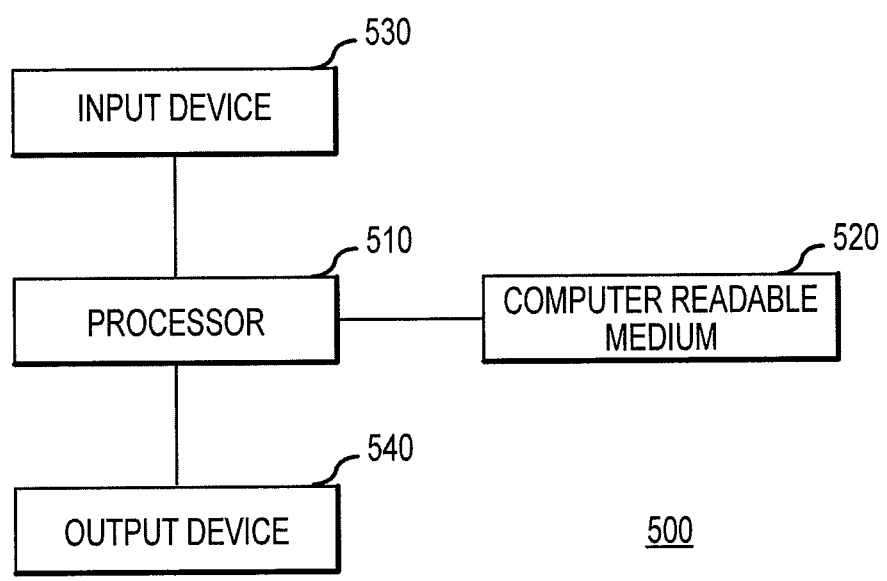
FIG. 5 is a schematic diagram of a system according to an embodiment of the present invention.

Embodiments of methods described above may be implemented by a processor-based system including a computer readable media encoded with instructions that, when executed, cause the processor-based system to perform all or portions of the methods described above. An embodiment of a processor-based system 500 according to the present invention is shown in FIG. 5. A processor 510 is coupled to a computer readable medium 520. The processor and computer-readable medium may be coupled through any known transmission medium, wired or wireless, and in some embodiments the computer readable medium 520 may be integrated with the processor 510. The computer readable medium may include any kind of storage media, such as CD, DVD, Flash drive, disk drive, memory device or the like. Data structures including embodiments of indicators, tables, and associations described above may be stored on the computer readable medium 520 in some embodiments, or may be stored on another computer readable medium in communication with the processor 510 in other embodiments. The computer readable medium 520 may be encoded with computer readable instructions causing the processor 510 to perform one or more of the acts described above and/or shown in FIG. 1. The processor 510 may also be coupled to one or more input devices, such as input device 530 and one or more output devices, such as output device 540. Input devices may include an input port operable to receive data from one or more other systems or users in embodiments of the present invention. Input devices may further include a keyboard, video camera, or any other data generating device. Output devices in accordance with the present invention may include one or more displays, storage systems, or an output port for transmitting output data, such as data from a storage system.

Figure 6:
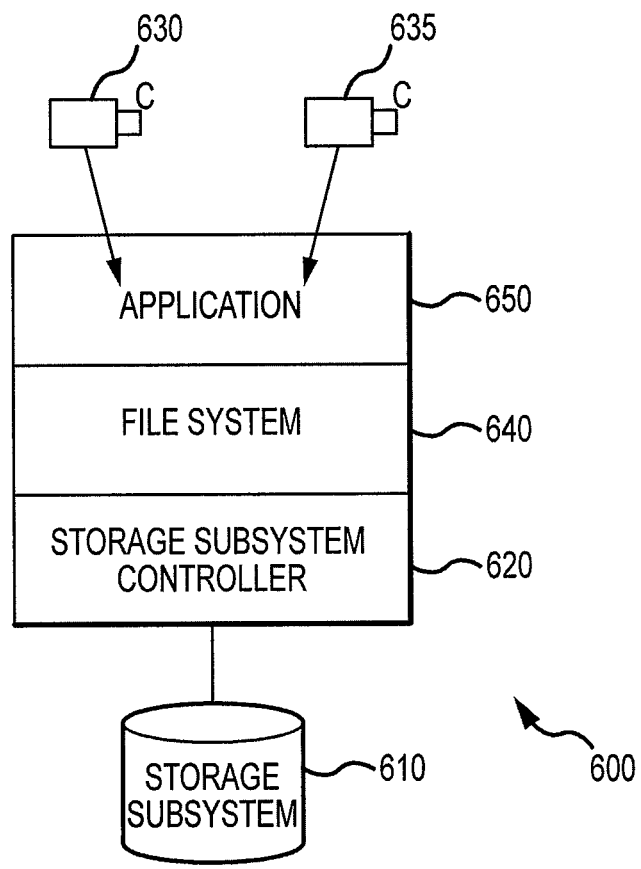
FIG. 6 is a schematic diagram of a video surveillance system according to an embodiment of the present invention.

An embodiment of a system 600 according to the present invention is shown in FIG. 6. The system 600 is designed to control storage of data in storage subsystem 610. The amount of space in the storage subsystem 610 itself, or the amount of space in the storage subsystem 610 devoted to a particular application may be determined in accordance with embodiments of methods described above. That is, in some embodiments, the storage subsystem 610 is overprovisioned by providing an extra amount of storage beyond what is required simply by calculating how much data is required by an application to be stored and for how long. An overprovisioning amount is provided to help ensure sequential disk block addresses become available as data is being written to the storage subsystem 610. The overprovisioning amount may be determined with reference to the application requirements, the time and amount of data to be stored, and the time required to make locations no longer needed available, as described above. Any amount of overprovisioning may be used. In some embodiments, however, addition storage between 20 to 50 percent of the storage required by an application is provided. Storage subsystem 610 may include any kind of storage devices known in the art, including disk drive storage in some embodiments.

The disk drive storage may be prepared in accordance with any storage method known in the art, including one or more RAID levels, such as RAID 5 or 6 in some embodiments. The storage subsystem 610 may itself serve as non-volatile storage for storing versions of the free block indicator and logical block associations described above, in some embodiments. In other embodiments a separate back-up storage is provided to store these indicators and associations for use in the event of a system interruption. The storage subsystem 610 contains storage having a number of disk block addresses, described above. Write and read requests designed for the storage subsystem 610, however, specify logical block addresses, as described above.

A storage subsystem controller 620 is coupled to the storage subsystem 610 through any available communication medium, wired or wireless, and passes write and/or read requests to the storage subsystem 610 in accordance with embodiments of methods according to the present invention. For example, the storage subsystem controller 620 is operable to convert non-sequential write requests into sequential write operations within the storage subsystem 610 in some embodiments. The storage subsystem controller 620 may include the processor 510 and computer readable medium 520 shown in FIG. 5 in some embodiments. In other embodiments, the storage subsystem controller 620 includes the processor 510 of FIG. 5, but the computer readable medium 520 is not shown in FIG. 6. In still other embodiments, the storage subsystem controller 620 operates in conjunction with the application 650 and file system 640 to perform the functionality of the processor 520 of FIG. 5. The system 600 further includes one or more input devices that generate data for write requests and/or request reads from the storage subsystem 610. The input devices shown in FIG. 6 include video cameras 630 and 635. The cameras 630 and 635 generate video data for storage in the storage subsystem 610. The storage subsystem controller 620 may further interface with a file system 640 and application program 650, running on a shared or different processor than that of the storage subsystem controller 620 in some embodiments.

The application receives data from the cameras 630 and 635 in some embodiments and develops appropriate write requests. In some embodiments the application 650 may manipulate the data received from cameras 630, 635, perform data compression or other functionality. The data and/or write requests are passed to the file system 640 in some embodiments, and the file system, such as Microsoft NTFS in one embodiment, determines a logical block address for each write request. The logical block address and write request is passed to the storage subsystem controller 620 which can determine an appropriate disk block address of the storage subsystem 610 in accordance with embodiments of the invention.

Figure 7:
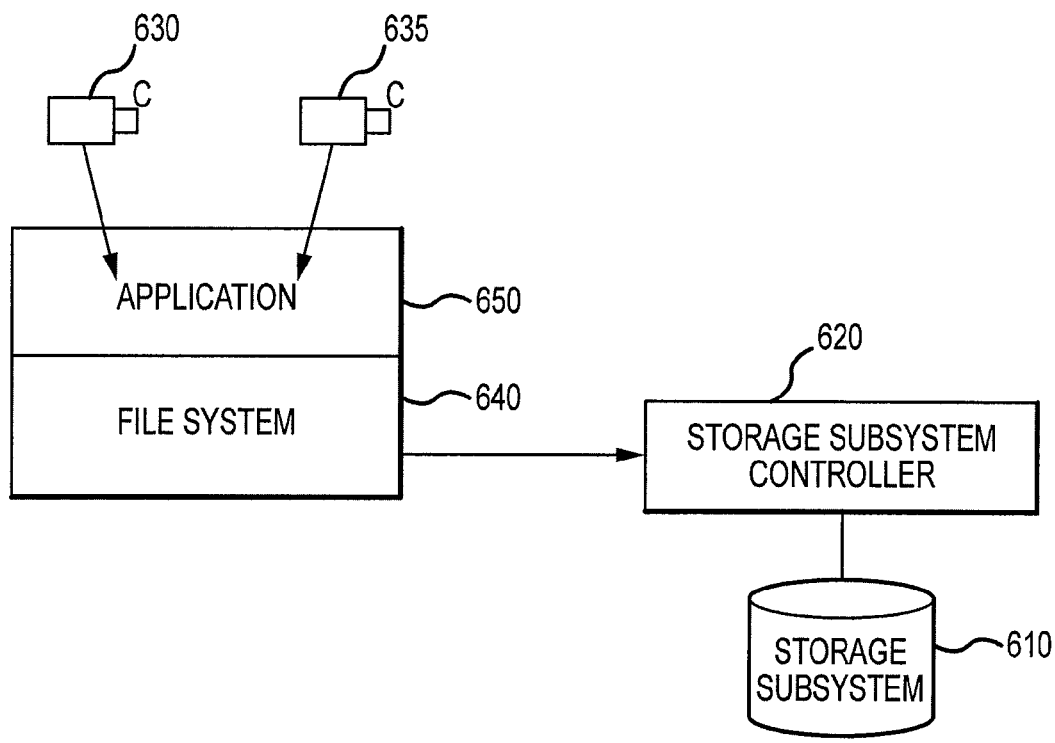
FIG. 7 is a schematic diagram of a video surveillance system according to another embodiment of the present invention.

FIG. 7 illustrates another configuration of the system of FIG. 6. Instead of forming an integrated unit, the storage subsystem controller 620 may be separated from the system running the file system 640 and the application 650. A network connection, including but not limited to, an Internet connection, may be used to communicate write and read requests between the file system 640 and the storage subsystem controller 620 in the embodiment of FIG. 7.

Accordingly, embodiments of the present invention may increase performance of a data storage system or program. Some embodiments of the present invention may be used to improve performance of a video surveillance system or application, including but not limited to, Intransa's StorStac for video surveillance application. Video surveillance applications typically require many writes, but comparatively fewer reads, and therefore are benefited by embodiments described that speed the storage of write requests. Other applications have similar properties, such as data archiving applications, and those may be similarly improved using embodiments of the present invention. Some embodiments of the present invention slow down read requests, however, because sequential read operations are turned into random reads. In some embodiments, read requests may be slowed down by as much as five times. However, this slow down does not significantly hamper some embodiments of applications having relatively few read operations, such as video surveillance, for example.

Measurements taken using embodiments of the present invention to convert random writes to sequential writes indicate improved performance can be achieved relative to a system performing random writes. In one measured embodiment, performance of one configuration of a RAID5 subsystem improved from a random write throughput of 17 MB/sec to a sequential write throughput of 60 MB/s. Another configuration of a RAID5 subsystem exhibited improvement from a random write throughput of 7 MB/s to a sequential write throughput of 70 MB/s. These measured performance results are intended to demonstrate advantages of some embodiments of the present invention. Other factors including the number of read requests, system loading, and the like, may slow the system or decrease the advantages of the present invention. The measured data is representative only of one set of measurements under otherwise fixed conditions and is meant to highlight some conditions under which improvement can be achieved using embodiments of the present invention.

Writing to sequential disk block addresses usually achieves better performance, in that the write requests can be completed faster. One reason for this, is that writing to disparate locations requires more time for the disk to seek and spin to that location. Other reasons for improved performance may be associated with the particular disk formatting used. For example, in RAID5, a sequential write avoids two fill-in reads necessary for parity computation, in RAID6, a sequential write avoids three fill-in reads necessary for parity computation.

From the foregoing it will be appreciated that, although specific embodiments of the invention have been described herein for purposes of illustration, various modifications may be made without deviating from the spirit and scope of the invention. Embodiments of the present invention described herein may be implemented in hardware, software, or combinations thereof.

What is claimed is:

1. A video surveillance system comprising:
   at least one video camera providing a predetermined amount of data for a predetermined time;
   a storage system coupled to the at least one video camera and having storage space divided into a plurality of disk block addresses and being configured to have free storage space available within an adjustment time after the predetermined time, the storage system being at least equal to the predetermined amount for the predetermined time plus an over-provisioning amount based on the predetermined amount of received data, the predetermined time and the adjustment time, such that sequential disk block addresses are available to store incoming write requests; and
   a processing system coupled to the storage system and the at least one video camera for receiving a plurality of write requests from the at least one video camera directed to non-sequential logical block addresses in the storage system and for writing the plurality of write requests to sequential disk block addresses in the storage system.

2. The video surveillance system according to claim 1 wherein the processing system includes:
   a processor; and
   a computer-readable medium having computer-executable instructions that, when executed by the processor, converts first and second received write requests directed to first and second received non-sequential logical block addresses to sequential write requests for use with a storage system that includes sequential first and second free disk block addresses, the first and second free disk block addresses different than the first and second received logical block addresses, the computer-executable instructions including instructions for:

receiving the first write request directed to the first received logical block address;

writing the first write request to the first free disk block address;

storing an association between the first free disk block address and the first received logical block address;

receiving the second write request directed to the second received logical block address;

writing the second write request to the second free disk block address; and storing an association between the second free disk block address and the second received logical block address.

* * * * *